A. F. BATCHELDER.
ELECTRIC LOCOMOTIVE.
APPLICATION FILED APR. 7, 1909.

988,067.

Patented Mar. 28, 1911.
4 SHEETS—SHEET 1.

WITNESSES:
W. Ray Taylor.
Helen O. Ford

INVENTOR:
ASA F. BATCHELDER
BY Albert G. Davis
ATTY

A. F. BATCHELDER.
ELECTRIC LOCOMOTIVE.
APPLICATION FILED APR. 7, 1909.
988,067.
Patented Mar. 28, 1911.
4 SHEETS—SHEET 2.
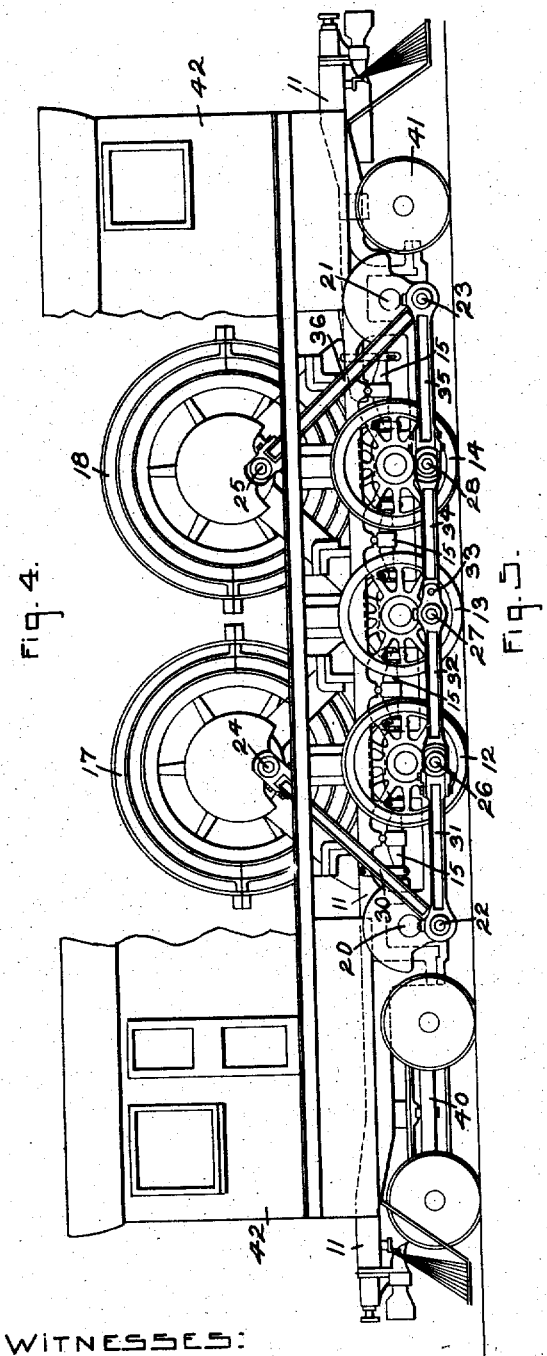
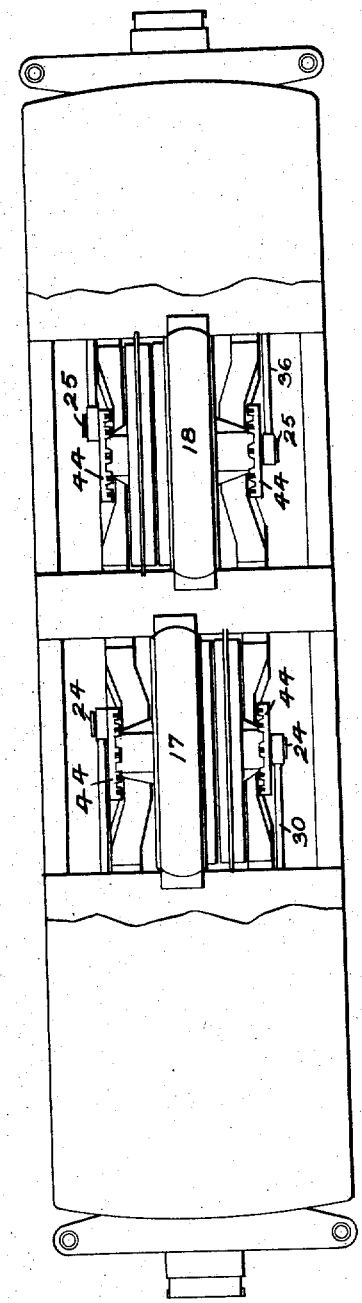
WITNESSES:
M. Ray Taylor.
Hellen Oxford
INVENTOR:
ASA F. BATCHELDER
BY
ATTY.

A. F. BATCHELDER.
ELECTRIC LOCOMOTIVE.
APPLICATION FILED APR. 7, 1909.
988,067.
Patented Mar. 28, 1911.
4 SHEETS—SHEET 3.
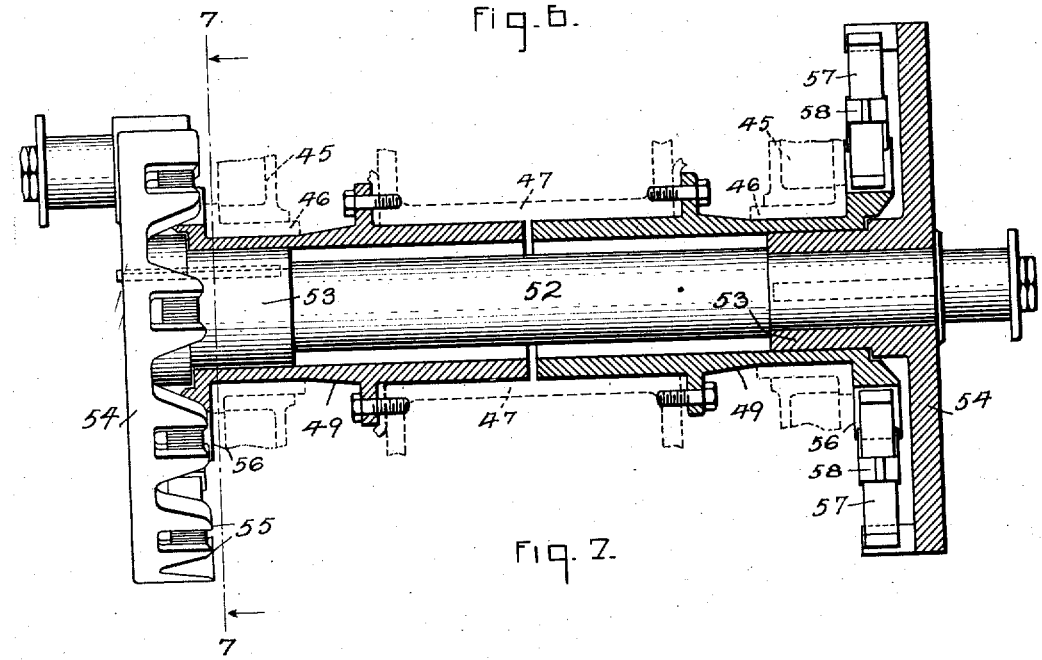
Fig. 6.
Fig. 7.
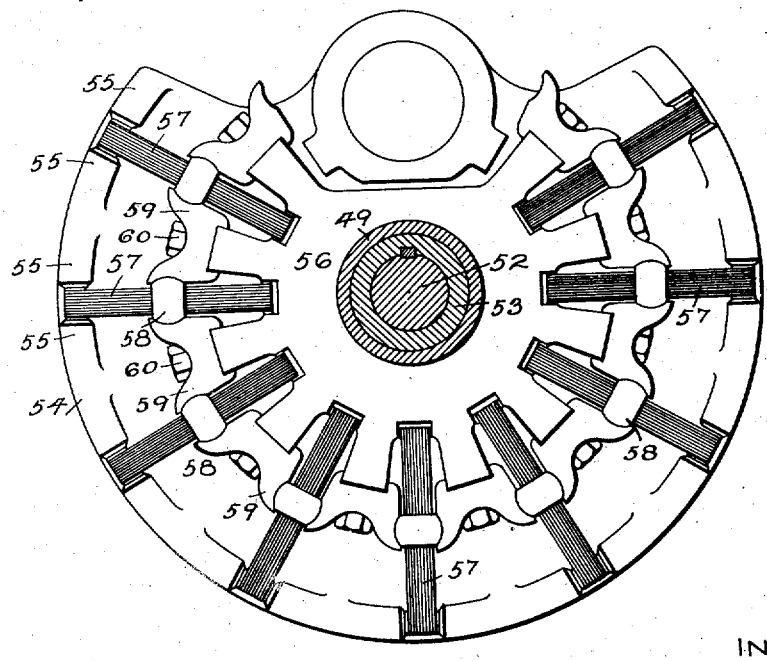
WITNESSES:
M. Ray Taylor.
Helen Oxford
INVENTOR
ASA F. BATCHELDER
BY Albert H. Davis
ATT'Y

A. F. BATCHELDER.
ELECTRIC LOCOMOTIVE.
APPLICATION FILED APR. 7, 1909.

988,067.

Patented Mar. 28, 1911.
4 SHEETS—SHEET 4.

WITNESSES:
W. Ray Taylor.
Allen Oxford

INVENTOR:
ASA F. BATCHELDER
BY Albert G. Davis
ATTY.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

ELECTRIC LOCOMOTIVE.

988,067.  Specification of Letters Patent.  Patented Mar. 28, 1911.

Application filed April 7, 1909. Serial No. 488,517.

*To all whom it may concern:*

Be it known that I, ASA F. BATCHELDER, a citizen of the United States, residing at Schenectady, county of Schenectady, State of New York, have invented certain new and useful Improvements in Electric Locomotives, of which the following is a specification.

My invention relates to electric locomotives, and particularly to a certain new type of locomotive possessing advantages hereinafter set forth.

My invention consists broadly in an electric locomotive comprising a frame, a plurality of driving wheels mounted therein, a jack-shaft journaled in said frame beyond said driving wheels and substantially in the same plane as the axles of the latter, a motor mounted on said frame over said driving wheels and so arranged that the plane through the motor shaft and the jack-shaft will meet at an angle the plane through the jack-shaft and the wheel axles, and crank and connecting rod connections between said driving wheels and said jack-shaft and between the latter and the rotating member of the motor.

In the accompanying drawings certain preferred embodiments of my invention are illustrated, these being hereinafter fully described.

Figure 1:
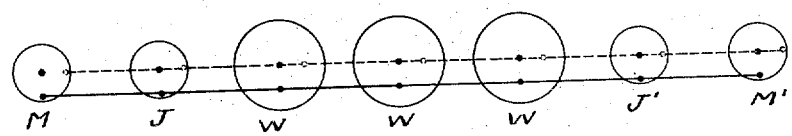
Figure 2:
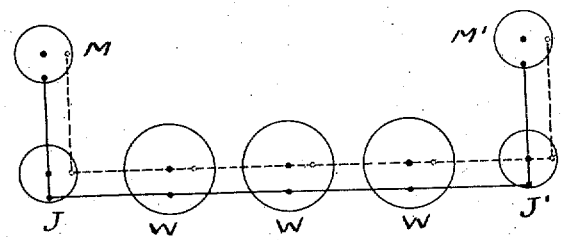
Figure 3:
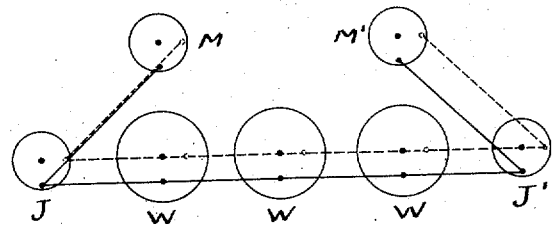
Figure 10:
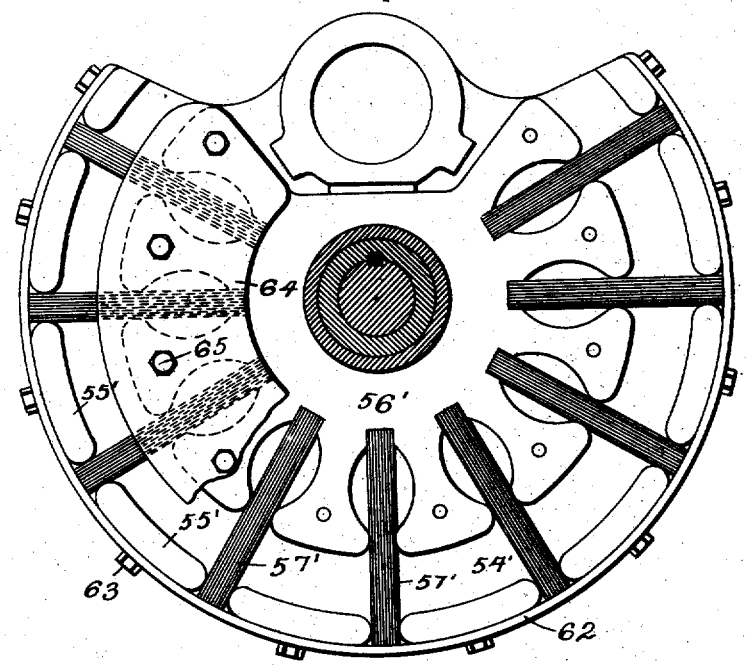
Figure 8:
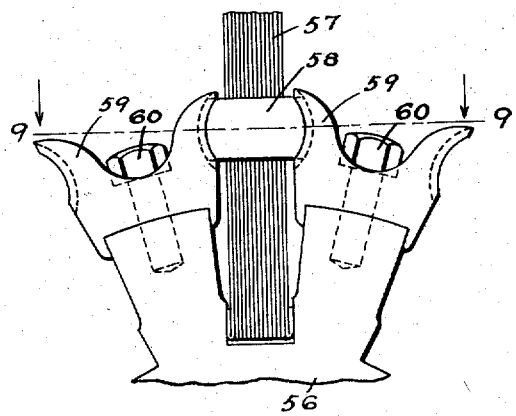
Figure 9:
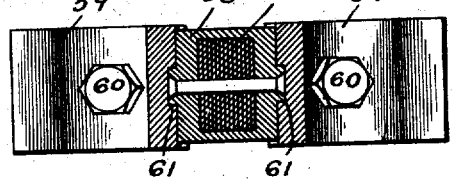

In the drawings, Figures 1, 2 and 3 are diagrams serving to illustrate three arrangements of driving apparatus for a locomotive, these diagrams being hereinafter referred to in connection with an explanation of one of the advantages of the particular arrangement of apparatus which I have shown; Fig. 4 is a side elevation, partly in section, of a locomotive having my invention incorporated therein, certain parts of the locomotive being omitted for the sake of clearness; Fig. 5 is a plan view, serving principally to show the relation of the motor cranks on opposite sides of the locomotive; Fig. 6 is an elevation, partly in section, of a portion of the movable member of a motor, illustrating particularly the spring drive; Fig. 7 is a section on the line 7—7 of Fig. 6 looking in the direction of the arrows; Fig. 8 is an enlarged view of a portion of the spring drive shown in Fig. 7; Fig. 9 is a view on the line 9—9 of Fig. 8 looking in the direction of the arrows, and Fig. 10 is a view similar to Fig. 7, showing a modified form of spring drive.

Like parts are referred to throughout the several views by the same reference characters.

Before proceeding to describe my invention and the particular embodiment of it which I have illustrated, I will point out some of the advantages which it offers over the types of locomotives heretofore used.

When the driving motors of any electric locomotive are located adjacent the driving axles the size of the motors is limited by many considerations, the principal one of which is lack of space, since the distance between the wheels is fixed and a certain clearance between the under parts of the locomotive and the road-bed must be allowed for. Increase in size of the driving wheels results, of course, in decrease of tractive effort, and increase of the motors beyond a certain size, allowed by increase of size of wheels, is not advantageous. The location of the motors adjacent the wheel axles and beneath the body of the locomotive has also presented certain disadvantages, owing to the fact that when so placed the motors are not readily accessible for the purpose of adjusting and repairing the brushes, and for other reasons in the nature of facility in general repair of the motors. This location of the motors also makes it necessary that they be completely inclosed in order to effectively shield them from dirt and moisture. It has been claimed also that location of the motors adjacent the wheel axles results in making the center of gravity of the locomotive so low that the lateral movement of the latter during operation, exerts upon the rails hammer blows which are unrelieved, to a large extent, by the locomotive springs.

In the type of locomotive hereinafter described I have removed the causes of many of the objections above noted.

My improved form of locomotive is characterized by the fact that the motors are located above the driving wheels upon the body frame of the locomotive and within the cab and are connected to the driving wheels by suitable gearing, using this term in its broadest sense. Owing to the fact that it is necessary that the axles of the driving wheels have a certain vertical movement with reference to the frame of the locomotive, and that the motors be rigidly supported on said frame, the distance between the motor shafts and the axles of the driving wheels is not constant. I therefore employ jack-shafts between the motors and the driving wheels, said jack-shafts being journaled in bearings fixed in the frame, the motors being geared to said jack-shafts and said jack-shafts in turn geared to the driving wheels. By locating the jack-shafts in substantially the same plane as the driving wheel axles, the slight vertical movement of the wheel axles in the frame results only in a very small variation in the distance between the jack-shafts and the wheel axles, which variation can easily be allowed for by a slight lost motion in the gearing between the jack-shafts and the axles. The form of gearing which I find most suitable for transmitting the power of the motors to the driving wheels, is cranks and connecting rods, the cranks on the wheels, jack-shafts and rotating members of the motors being located in each case approximately at right angles on opposite sides of the locomotive.

It is necessary that enough driving wheels be used to prevent the pressure between any driving wheel and the track from exceeding a certain amount and in the larger sizes of locomotives a considerable number of driving wheels is, therefore, necessary. There is, however, a limit to the length of rigid wheel base which a locomotive can have and operate satisfactorily and it is generally desirable to locate the driving wheels as near together as possible. For this reason, among others, I locate the jack-shafts not between the driving wheels but in front of or behind them; thus, when two jack-shafts are employed, placing one ahead of and the other behind the driving wheels. It is desirable also that the motors be near the center of the locomotive, in order to concentrate as much of the weight of the locomotive as possible around the vertical line drawn through its center, thereby reducing the moment of inertia of the locomotive around this axis. This arrangement also facilitates placing as much as possible of the total weight of the locomotive on the driving wheels. It is also desirable to leave a space at either end of the locomotive for the location of the control apparatus and the operator's compartments.

In addition to the foregoing reasons for locating the motors near the middle of the locomotive and above the driving wheels and the jack-shafts one in front of and the other behind the driving wheels, I regard it as desirable to arrange the parts in this way in order to decrease as much as possible the angle at which the planes through the motor shafts and the jack-shafts meet the plane through the jack-shafts and the wheel axles. The smaller this angle, the less power it is necessary for the jack-shafts to transmit from one side of the locomotive to the other during the rotation of the system. That this is so will be understood from an inspection of Figs. 1, 2 and 3, which show diagrammatically three arrangements of motors, jack-shafts and driving wheels. In all these figures M M' indicate the motors, J and J' the jack-shafts and W W W the wheels. These motors, jack-shafts and wheels are supposed to be connected by crank and connecting rod connections, the cranks on one side of the locomotive being set at 90° with the corresponding cranks on the other side. The connecting rods on what I shall call the "front" side are shown in full lines, while those on the "back" side are shown in dotted lines.

In Fig. 1 the axes of the motors, jack-shafts and wheels are all in the same plane and it is evident that at all times the motors will furnish power on either side for the wheels on that side, and that theoretically no power will ever be transmitted from one side of the locomotive to the other through the jack-shafts.

In Fig. 2 the motors are located directly above the jack-shafts. It is evident that, in the position shown, since the connecting rods between the motors and the jack-shafts on the front side are on dead center, the power of the motors will all be transmitted from the motor to the jack-shafts through the cranks and connecting rods on the back side of the locomotive; and that, since the connecting rods between the jack-shafts and wheels are on the back side of the locomotive on dead center, the wheels will be driven through the cranks and connecting rods between the jack-shafts and the wheels on the front side of the locomotive. With this arrangement, therefore, at the time when the parts are in the position shown in Fig. 2, all the power furnished by the motors will be transmitted on the back side of the locomotive to the jack-shafts, will pass through the jack-shafts to the front side of the locomotive and will be transmitted to the wheels on that side. It would, therefore, be necessary in the arrangement of Fig. 2 to make the jack-shafts capable of transmitting the full power furnished by the motors.

In the arrangement of Fig. 3 the motors are located with the parts in the position shown, the connecting rods between the jack-shafts and the wheels on the back side of the locomotive are on dead center so that the driving of the wheels is at that instant being all done from the front side of the locomotive. It is evident, however, that the power furnished by the motors at that instant is being transmitted to each jack-shaft partly on one side and partly on the other side of the locomotive, and that only a portion of it, say, one-half, will be transmitted through the jack-shafts from the back side to the front side. With the arrangement of Fig. 3, therefore, it is evident that at no time would the total power furnished by a motor be transmitted through its jack-shafts from one side of the locomotive to the other. Of the three arrangements indicated in Figs. 1, 2 and 3, that of Fig. 1 is the best as far as transmission of the power from the motors through the jack-shafts to the wheels is concerned. The necessity, however, in that arrangement of locating the motors near the ends of the locomotive, renders the arrangement undesirable; with the motors so arranged, most of the objections noted above which now exist from locating of the motors adjacent the wheel axles would be present, and in addition the objection of locating such a considerable portion of the total weight of the locomotive near the ends thereof. The arrangement of Fig. 2 would be less objectionable than that of Fig. 1, but, as explained above, would require the jack-shafts to be made large enough to transmit at certain times the total power delivered by the motors from one side of the locomotive to the other; in this arrangement, also, the weight of the motors would be objectionably near the ends of the locomotive. In the arrangement of Fig. 3, however, the total power of the motors is never transmitted from one side of the locomotive to the other through the jack-shafts and the weight of the motors is concentrated as near the center of the locomotive as possible. The arrangement of Fig. 3 is, therefore, the most desirable of the three and presents the many advantages hereinbefore referred to.

Owing to the fact that the torque exerted by single phase motors is not steady but is constantly varying from zero to the maximum, it has been found desirable, where such motors are used for railway work, to provide a spring drive between the motors and wheels whereby this varying torque of the motors is reduced to a more or less constant torque for application to the driving wheels. These spring drives have heretofore been built into the driving wheels. In the locomotive illustrated in this application I have shown spring drives located not in the driving wheels but instead in the rotating member of the motors and have provided a particular form of spring drive which possesses certain advantages hereinafter pointed out. I consider that the spring drive in its particular location with reference to the other parts of my locomotive as an important feature of my invention, and I regard the particular type of spring drive, which I have illustrated, as possessing certain advantages which do not limit it to this particular use.

The advantages which my arrangement of driving apparatus offers over the arrangements in the locomotives of the prior art, will be understood from the foregoing description. The motors being located within the cab can be made large and by using only two, to furnish the power ordinarily furnished by four motors when arranged adjacent the wheel axles, a considerable saving in the total cost of the motors can be made. In my arragement the center of gravity of the locomotive is high enough to allow the springs to relieve the lateral forces exerted upon the rails by "nosing" of the locomotives. The motors are accessible for the purposes of adjustment and repair and their ventilation by forced draft is facilitated, while at the same time they are effectively shielded from dirt and moisture.

Referring to Figs. 4 and 5, the body frame of the locomotive is indicated at 11, in which frame are mounted driving wheels 12, 13 and 14. The journal boxes of the driving wheels 12, 13 and 14 are arranged in the usual way for sliding movement in a vertical direction in the frame 11, suitable springs 15 being arranged to yieldingly support the frame upon the journal boxes in any well known manner. Two motors 17 and 18 are rigidly mounted upon the frame 11 in any suitable manner and in the arrangement shown are located directly over the driving wheels 12 and 14. Each of the jack shafts 20 and 21 is mounted in bearings fixed in the frame 11 between one of the driving axles and the adjacent end of the frame. These jack shafts are in substantially the same horizontal plane as the driving axles and have their axes parallel with that of the motor, but in a different plane therefrom. They are provided on each end with balanced cranks 22 and 23 which on each jack shaft are set at 90° from one another. The rotating member of each motor is also at each end provided with balanced cranks 24 and 25 set at 90° from one another. The driving wheels 12, 13 and 14 are provided with crank-pins 26, 27 and 28 at each end, those on each pair of driving wheels being set at 90° from one another and the wheels being counterweighted in a well-known manner. All the cranks 22 to 28 inclusive are located at the same radius. On the side of the locomotive shown, cranks 22 and 24 are connected by an inclined connecting rod 30; cranks 22 and 26 by a substantially horizontal coupling or connecting rod 31; cranks 26 and 27 by a coupling or connecting rod 32, this rod being extended beyond the crank 27 and carrying a pin 33 by which one end of the coupling or connecting rod 34 is pivotally connected to the rod 32, the other end of the rod 34 being connected to the crank 28; cranks 28 and 23 are connected by a coupling or connecting rod 35; and cranks 23 and 25 by an inclined connecting rod 36. It is to be noted that the inclination of each of the connecting rods 30 and 36 is at an angle to the horizontal, that is, the plane through each motor shaft and the jack-shaft nearest thereto meets at an angle the plane through the wheel axles and jack-shafts. I preferably make this angle approximately 45°. With this arrangement, which is duplicated on the other side of the locomotive, it is clear that the motors will drive the wheels through the cranks, connecting rods and jack-shafts, and that, since the cranks on one side of the locomotive are all located at right angles to the corresponding cranks on the other side, the whole system can never at any time be on dead center.

A two axle leading truck 40 is shown at one end of the locomotive, and a single axle leading truck 41 at the other end thereof. A portion of the cab is shown in outline at 42.

Between the rotating members of the motors 17 and 18 and their cranks are spring drives which are partially illustrated at 44 in Figs. 4 and 5 and are shown in detail in Figs. 6, 7, 8 and 9. Referring to the latter figures, a portion of the main frame of the motor is indicated at 45 in dotted lines, and the brasses of the journals for the rotating member of the motor at 46. A portion of the rotating member proper is indicated at 47 as in the form of a hub into which are inserted and held by bolts sleeves 49 which are journaled in the brasses 46, as shown in Fig. 6. Through the sleeves 49 passes a shaft 52 to either end of which is keyed a sleeve 53, each of which is fitted for rotation within one of the shells 49. Preferably made integral with the sleeve 53 is a disk 54 which carries the crank pin for that side of the motor. This disk 54 is smooth on its side away from the motor and the other side carries a circular row of lugs 55 arranged in pairs as shown. The outer ends of the shells 49 are enlarged into plates or spiders 56 in the form best shown in Fig. 7.

The driving connections between the shells 49 and the crank disks 54 consist of a plurality of leaf springs 57 each of which consists of a bundle of thin strips of steel bound together by rings 58 held, as best shown in Figs. 8 and 9, between clamping members 59 bolted to the ends of the legs of the spider 56 by bolts 60. In order to prevent the springs from moving laterally out of the grip of the clamping members 59, the rings 58, which bind the leaves of a spring together, are provided with lugs 61, as best shown in Fig. 9, which engage with slots in the clamping members 59 as will be understood from Figs. 8 and 9. With this arrangement it is seen that the springs 57 are secured to the spider 56 and extending outwardly engage with the lugs 55 on the inside of crank disk 54 and serve as a yielding driving connection between the spider 56 and the crank disk 54. The torque of the motor is thus transmitted from the rotating member or armature 47, through the shells 49 and the spring driving connections to the disks and pins. The disk 54 being cut away, as shown in Fig. 7, at the side where the crank pin is located, is balanced as a whole. With a spring driving connection of this kind the pulsating torque furnished by a single-phase alternating current motor is changed into a comparatively uniform torque delivered at the cranks of the motors.

In Fig. 10 a modified form of driving connection is shown which is similar to that of Figs. 6 to 9. In the construction of Fig. 10 the spider 56' is of the form shown, and the springs 57' are held between the legs of the spider directly and not by means of removable clamping members. The disk 54' is provided with lugs 55'. Between these lugs 55' the outer ends of the springs 57' are inserted and a ring 62 secured to the lugs 55' by screws 63 and a plate 64 secured to the spider 56' by screws 65 hold the springs 57' in their proper position in coöperation with the spider 56', and the lugs 55'. In the device of Fig. 10, therefore, as in that of Figs. 6 to 9 the leaf springs serve as a yielding connection between the rotating member of the motor and the crank disks and pins.

While I have shown certain forms in which my invention may be embodied I do not wish to be understood as limiting myself to these except as called for by the following claims.

What I claim as new and desire to secure by Letters Patent of the United States, is,

1. In an electric locomotive, a frame, a plurality of driving wheels mounted therein, a jack-shaft journaled in said frame beyond said driving wheels and substantially in the same plane as the axles of the latter, a motor mounted on said frame over said driving wheels and so arranged that the plane through the motor shaft and the jack-shaft will meet at an angle the plane through the jack-shaft and the wheel axles, and crank and connecting rod connections between said driving wheels and said jack-shaft and between the latter and the rotating member of the motor.

2. In an electric locomotive, a frame, a plurality of driving wheels mounted therein, two jack shafts journaled in said frame, one ahead of and the other behind said driving wheels and substantially in the same plane as the axles of the latter, two motors mounted on said frame over said driving wheels and so arranged that the planes through each motor shaft and the jack shaft nearest thereto will meet at an angle, and crank and connecting rod connections between said driving wheels and said jack shafts and between each of the latter and the rotating member of the nearest motor.

3. In an electric locomotive, a frame, a plurality of pairs of driving wheels journaled therein, two shafts journaled in said frame, one ahead of and the other behind said driving wheels and substantially in the same plane as the axles of the latter, two motors mounted on said frame over said driving wheels and so arranged that the planes through each motor shaft and the jack shaft nearest thereto will meet at an angle, and crank and connecting rod connections between said driving wheels and said jack shafts and between each of the latter and the rotating member of the nearest motor, the cranks on the wheels, jack shafts and rotating members of said motors being in each case approximately at right angles on opposite sides of the locomotive.

4. In an electric locomotive, a frame, a plurality of pairs of driving wheels, journal boxes for said pairs of wheels mounted in said frame for sliding vertical movement with reference thereto, spring connections between said frame and said journal boxes by which the former is supported upon the latter, two jack shafts journaled in said frame one ahead of and the other behind said driving wheels and substantially in the same plane as the axles of the latter, two motors mounted on said frame over said driving wheels and so arranged that the planes through each motor shaft and the jack shaft nearest thereto will be inclined to the horizontal, and crank and connecting rod connections between said driving wheels and said jack shafts and between each of the latter and the rotating member of the nearest motor, the cranks on the wheels, jack shafts and rotating members of the motors being in each case approximately at right angles on opposite sides of the locomotive.

5. In an electric locomotive, a frame, a plurality of driving wheels mounted therein, two jack shafts journaled in said frame, one ahead of and the other behind said driving wheels and substantially in the same plane as the axles of the latter, two motors mounted on said frame over said driving wheels and so arranged that the planes through each motor shaft and the jack shaft nearest thereto will be at approximately 45° to the horizontal, and crank and connecting rod connections between said driving wheels and said jack shafts and between each of the latter and the rotating member of the nearest motor.

6. In an electric locomotive, a frame, a plurality of driving wheels mounted therein, two jack shafts journaled in said frame, one ahead of and the other behind said driving wheels and substantially in the same plane as the axles of the latter, two motors mounted on said frame over said driving wheels approximately midway between said jack shafts and so arranged that the planes through each motor shaft and the jack shaft nearest thereto will be at approximately 45° to the plane through the wheel axles and jack shafts, and crank and connecting rod connections between said driving wheels and said jack shafts and between each of the latter and the rotating member of the nearest motor, the cranks on the wheels, jack shafts and rotating members of said motors being in each case at approximately right angles on opposite sides of the locomotive.

7. In an electric locomotive, a frame, a plurality of driving wheels mounted therein, two jack shafts journaled in said frame, one ahead of and the other behind said driving wheels and substantially in the same plane as the axles of the latter, two motors mounted on said frame over said driving wheels and so arranged that the planes through each motor and the jack-shaft nearest thereto will be inclined to the horizontal, crank and connecting rod connections between said driving wheels and said jack-shafts, and crank and connecting rod spring driving connections between each jack-shaft and the rotating member of the nearest motor.

8. In a locomotive, a frame, a plurality of driving wheels mounted therein, two jack-shafts journaled in said frame one ahead of and the other behind said driving wheels and substantially in the same plane as the axles of the latter, two motors mounted on said frame over said driving wheels and arranged so that the planes through each motor and the jack-shaft nearest thereto will be inclined to the horizontal, crank and connecting rod connections between said driving wheels and said jack-shafts, cranks driven by each motor, spring driving connections between each motor and its cranks, and connecting rods connecting the cranks of each motor with the nearer jack-shaft.

9. In an electric locomotive, the combination of a supporting frame comprising two side frame members, a plurality of pairs of driving wheels fixed upon axles journaled in said frame with the capacity of relative vertical movement, springs through which said frame is supported on said axles, an electric motor supported on said frame, a jack shaft journaled in substantially the same horizontal plane as the driving axles, and having its axis parallel with that of the motor, but located in a different vertical plane therefrom, inclined connecting rods coupled to crank pins on the motor shaft and on the jack shaft, respectively, and substantially horizontal coupling rods connecting crank pins on the jack shaft with crank pins on the driving wheels.

10. In an electric locomotive, the combination of a supporting frame comprising two side frame members, driving wheels fixed upon one of a plurality of axles journaled in said frame, springs through which said frame is supported on said axles, a jack shaft journaled between one of the driving axles and the adjacent end of the frame, an electric motor supported on the side frame members, with its axis in a vertical plane farther from said end of the frame than that of the jack shaft, connecting rods coupled to crank pins on the motor shaft and on the jack shaft, respectively, and coupling rods connecting crank pins on the jack shaft with crank pins on the driving wheels.

In witness whereof, I have hereunto set my hand this 6th day of April, 1909.

ASA F. BATCHELDER

Witnesses:
BENJAMIN B. HULL,
HELEN ORFORD.

Copies of this patent may be obtained for five cents each, by addressing the "Commissioner of Patents, Washington, D. C."